US009359241B2

(12) United States Patent
Hansen

(10) Patent No.: US 9,359,241 B2
(45) Date of Patent: Jun. 7, 2016

(54) METHOD FOR RECYCLING MATERIAL WHEN MAKING A MINERAL MELT

(71) Applicant: Rockwool International A/S, Hedehusene (DK)

(72) Inventor: Lars Elmekilde Hansen, Roskilde (DK)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 14/362,260

(22) PCT Filed: Nov. 29, 2012

(86) PCT No.: PCT/EP2012/073895
§ 371 (c)(1),
(2) Date: Jun. 2, 2014

(87) PCT Pub. No.: WO2013/083464
PCT Pub. Date: Jun. 13, 2013

(65) Prior Publication Data
US 2014/0311184 A1    Oct. 23, 2014

(30) Foreign Application Priority Data

Dec. 7, 2011   (EP) .................................... 11192325

(51) Int. Cl.
*C03B 3/02* (2006.01)
*C03B 3/00* (2006.01)
*C03B 5/00* (2006.01)
*C03B 5/12* (2006.01)

(52) U.S. Cl.
CPC . *C03B 3/026* (2013.01); *C03B 3/00* (2013.01); *C03B 3/023* (2013.01); *C03B 5/005* (2013.01); *C03B 5/12* (2013.01)

(58) Field of Classification Search
CPC ............ C03B 3/026; C03B 3/00; C03B 5/12; C03B 5/005; C03B 3/023
See application file for complete search history.

(56) References Cited

U.S. PATENT DOCUMENTS 4,365,984 A * 12/1982 Gee .......................... C03B 5/005
110/264
6,698,245 B1 * 3/2004 Christensen ............. C03C 1/002
501/30
8,876,964 B2 * 11/2014 Cuypers .................... C03B 3/02
106/439

FOREIGN PATENT DOCUMENTS

EP      2105415 A1     9/2009

OTHER PUBLICATIONS

International Search Report & Written Opinion of PCT/EP2012/073895, dated Jan. 30, 2013.

*Primary Examiner* — Queenie Dehghan
(74) *Attorney, Agent, or Firm* — Dinsmore & Shohl LLP; Douglas L. Wathen

(57) ABSTRACT

The present invention concerns a method of making a mineral melt by burning combustible material in the presence of inorganic particulate material and thereby forming a melt, comprising injecting fuel, particulate mineral material and combustion gas into a circulating combustion chamber (1) through an inlet conduit (4) and combusting the fuel in the circulating combustion chamber (1) thereby melting the mineral material to form a mineral melt and generating exhaust gases; separating the exhaust gases from the mineral melt, collecting the mineral melt (9) and passing the exhaust gases upwards through an exhaust pipe (10) to a conduit (11) of a heat exchange system; and supplying particulate mineral material and a first portion of waste mineral wool into the conduit (11) and pre-heating the supplied material in the heat exchange system, and supplying a second portion of waste mineral wool with a water content between 5 and 25% by weight directly to the inlet conduit (4).

8 Claims, 1 Drawing Sheet

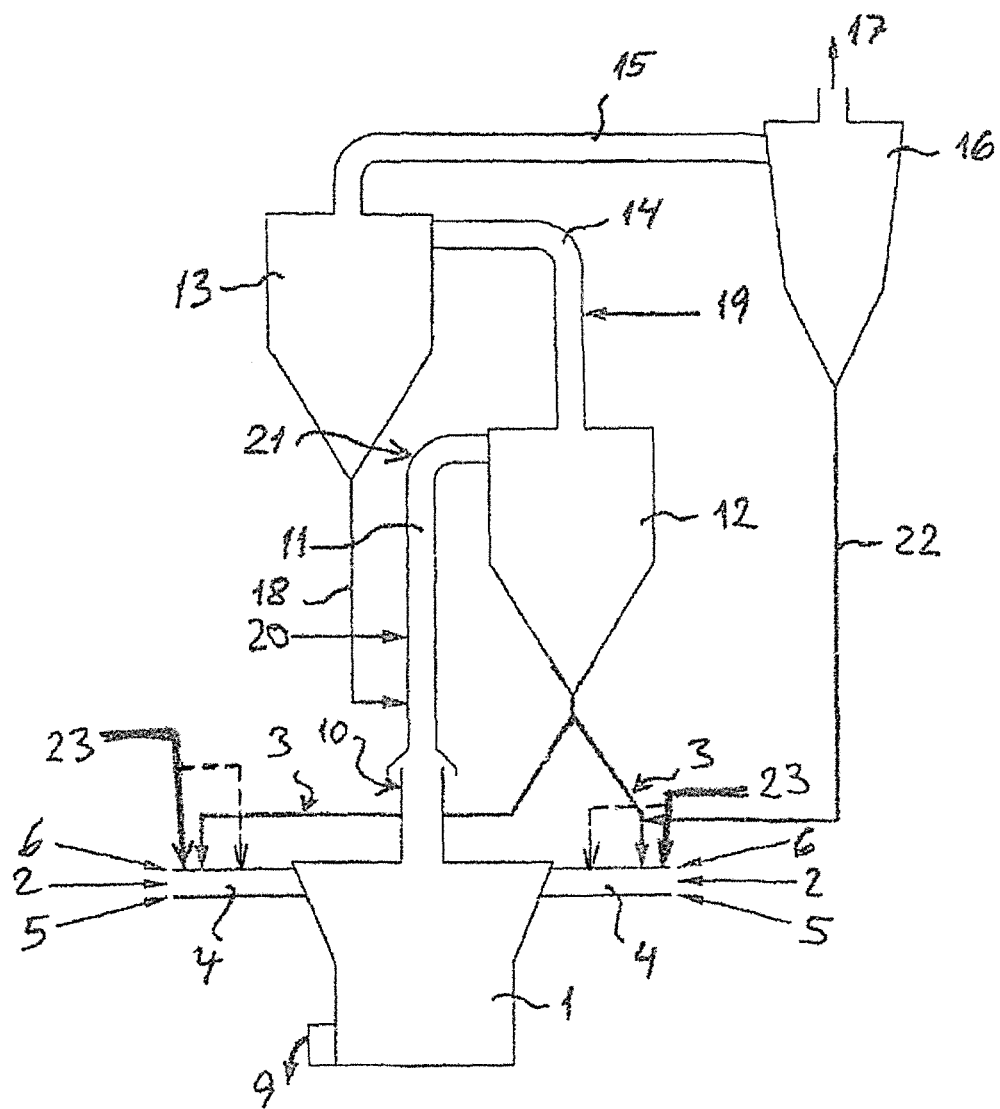

METHOD FOR RECYCLING MATERIAL WHEN MAKING A MINERAL MELT

CROSS-REFERENCE TO RELATED APPLICATIONS

This application is the U.S. National phase of PCT/EP2012/073895 Nov. 29, 2012, which claims priority of European Patent Application No. 11192325.6 filed Dec. 7, 2011.

The present invention relates to method for recycling waste material, such as mineral wool, in the production of a mineral melt by burning combustible material in the presence of particulate mineral material and thereby forming a melt. The melt can then be fiberised to form mineral fibres or used in other industrial processes.

BACKGROUND TO THE INVENTION

A system for the production of a mineral melt of the kind described above is disclosed in WO 03/002469. This system involves suspending powdered coal, or other fuel, in preheated combustion air and combusting the suspended fuel in the presence of suspended particulate mineral material in a circulating combustion chamber, i.e., a combustion chamber in which the suspended particulate materials and air circulate in a system which is or approaches a cyclone circulation system. This is commonly referred to as a cyclone furnace. The suspension of coal in preheated air and the particulate mineral material are introduced through the top or close to the top of the combustion chamber. Within the combustion chamber, combustion of the particulate coal occurs and the particulate material is converted to melt. The melt and particulate material that is not yet melted is thrown onto the walls of the chamber by the circulating gases and will flow down the chamber. The melt is collected in a settling tank at the bottom of the chamber.

In order to increase the energy efficiency of the cyclone furnace in WO 03/002469, the exhaust gases, which leave the circulating chamber at a temperature in the range of 1400 to 1700° C., are used to preheat the particulate material. WO 03/002469 teaches that the exhaust gases are quenched to 1000 to 1500° C. and then mixed with the mineral material to preheat it to a temperature of 700 to 1050° C.

WO 2009/118180, WO 2008/019780, WO 2008/086990 and WO 2008/086991 also disclose a cyclone system for making a mineral melt.

The cyclone furnace has significant advantages compared to cupola or other stack furnaces. With respect to fuel, it avoids the need for briquetting fine particles and a wide range of fuels can be used including, for example, plastic. Using a melting cyclone furnace eliminates the risk of reduction of the ores to iron and releases exhaust gases which are environmentally acceptable. The flexibility in melt capacity is much better than with a cupola furnace meaning that production can easily and quickly be switched, from, for example, 40% to 100% of total capacity so the time taken to respond to changing demands is greatly reduced. Furthermore, melting in a cyclone furnace is much quicker than is the case for a cupola furnace and is in the order of minutes, rather than in the order of hours.

Hence, using a melting cyclone furnace system is economically and environmentally desirable and the system disclosed in WO 03/002469 works well. An improved melting cyclone furnace system is disclosed in WO 2009/118180.

In this cyclone furnace system milled waste mineral wool is fed into the riser from the cyclone furnace to the lower preheater cyclone and the collected fly ash is fed into the preheated raw material immediately before it is fed to the cyclone furnace. A problem arising with this setup is that the waste mineral wool is heated to 750-800° C. in the preheater cyclone which results in burning all organic material and evaporation of all water. Thereby the material becomes a fine powder. It is difficult to retain this fine powder in the cyclone furnace and a relatively large amount ends up as small droplets or dust particles in the exhaust gases from the cyclone furnace. This "carry-over" adheres to the inner surfaces of the riser and the preheater cyclone and causes stop in the production when the amount of waste wool exceeds 10% of the total raw material charge. Similar carry-over problems arise with the fly ash, since it also appears as a very fine powder. Approximately 5-10% of the charged material ends as fly ash that must be recycled or deposited.

On this background, it is an object of the present invention to provide a method and an apparatus for recycling of waste material, such as waste mineral fibre wool and fly ash, avoiding the above-mentioned problem of causing a discharge of small droplets or fines to the outside of the furnace cyclone and the heat exchange system.

This object is achieved by a method of making a mineral melt by burning combustible material in the presence of particulate mineral material and thereby forming a melt, the method comprising the steps of injecting fuel, particulate mineral material and combustion gas into a circulating combustion chamber through an inlet conduit and combusting the fuel in the circulating combustion chamber thereby melting the mineral material to form a mineral melt and generating exhaust gases; separating the exhaust gases from the mineral melt, collecting the mineral melt and passing the exhaust gases upwards through an exhaust pipe to a conduit of a heat exchange system; and supplying particulate mineral material and a first portion of waste mineral wool into the conduit and pre-heating the supplied material in the heat exchange system, and supplying a second portion of waste mineral wool with a water content between 5 and 25% by weight directly to the inlet conduit.

The waste mineral wool contains some water and binder and it easily forms lumps. When the waste wool is added directly to the inlet of the cyclone furnace without any pre-heating, it therefore appears as lumps or large particles and it will be caught by the melt layer in the upper part of the cyclone furnace and carry-over is minimised. By adding the "wet" waste wool directly to the cyclone furnace the amount of recycled waste wool can be increased from 10% to 35% or even higher, which is advantageous for the waste wool balance on the production lines for manufacturing mineral wool fibre insulation products.

If at least some of the recycled fly ash is mixed with the wet waste wool it is also possible to minimise carry-over caused by fly ash, since it adheres to the lumps or particles of waste wool after mixing therewith. Practice has shown that if half of the fly ash is added to the waste wool it is possible to return all fly ash to the melting process and deposit of fly ash can be avoided.

In the preferred embodiment, the heat exchange system comprises a pre-heater cyclone, which is being fed via said conduit with the supply of preheated mineral material and the supply of waste mineral wool material for pre-heating before exiting the preheater cyclone through a supply conduit into the inlet conduit for injection into the circulating combustion chamber, whereby a third portion of waste material is supplied to the supply conduit. This waste material is preferably fly ash. This material is very fine with particle sizes below 10

μm. The fly ash is therefore supplied to the conduit before the inlet port of the cyclone furnace together with the pre-heated material.

Preferably, the second portion of waste mineral wool is mixed with fly ash before it is supplied directly to the inlet conduit.

In a preferred embodiment, the waste mineral wool is milled and has a water content of 10-15% by weight when supplied into the apparatus.

In an embodiment, approx. 20% of the total waste mineral wool is supplied into the conduit for pre-heating and approx. 80% of the total waste mineral wool is supplied directly into the inlet conduit. Although pre-heating the material may be more energy efficient, it is found advantageous that as much as 80% of the waste mineral wool is added "wet and cold", i.e. without advance preheating, so that the amount of fine particles is reduced and thereby the carry-over of these fine particles from the cyclone furnace is minimised. In one embodiment approx. 50% of the total fly ash is supplied in the supply conduit and approx. 50% of the fly ash is mixed with the waste mineral wool prior to being supplied directly into the inlet conduit. However, the optimal portion of fly ash to be mixed with the waste mineral wool depends on the separating efficiency of the pre-heating system.

In an embodiment, at least two oppositely arranged inlet conduits are provided, and waste material is supplied to at least one of said inlet conduits. Hereby, a higher capacity in the cyclone furnace may be achieved.

In the following the invention is described in further detail with reference to the accompanying drawing, in which FIG. 1 is a schematic diagram of an apparatus according to a preferred embodiment of the present invention.

FIG. 1 shows a circulating combustion chamber 1 which comprises a cylindrical top section, a frustoconical bottom section and a cylindrical base section. Particulate fuel is introduced into the circulating combustion chamber from supply 2 and is preferably coal. Preheated mineral material is introduced into the circulating combustion chamber via a mineral material conduit 3. In accordance with the invention the mineral material includes particulate mineral material and waste mineral wool. The coal and mineral material are introduced together with combustion air via an inlet conduit 4 and secondary air which is provided in compressed air supply 5 and is introduced through at least two tangential inlets such as a lance (not shown) into the circulating combustion chamber 1 to ensure thorough mixing of the coal 2 with the combustion air 6 and to sustain the circulating motion of the combustion gases and suspended material in the circulating combustion chamber 1. Secondary fuel, in this case natural gas may also be injected through supply (not shown) into the base section of the circulating combustion chamber 1.

The coal 2 is combusted in the combustion gas 6, which is preferably oxygen-enriched air 5, in the circulating combustion chamber 1. The resultant melt 9 is collected in the base zone of the circulating combustion chamber 1 and exits the chamber via an outlet. The exhaust gases are fed through the flue 10 at the top of the circulating combustion chamber 1 to the first conduit 11 where they are used to heat the granular mineral materials about to be fed into the circulating combustion chamber 1. The exhaust gases are then led to a first pre-heater cyclone 12 where they are separated from the mineral materials which are at this point mixed together. The exhaust gases flow from the first pre-heater cyclone 12 to the second pre-heater cyclone 13 via a second conduit 14. Following the second pre-heater cyclone 13 the exhaust gases flow through conduit 15 to a dust cyclone 16 and into a further treatment 17 where indirect heat exchange with the combustion gas occurs to preheat the combustion gas. The exhaust gases are then treated to make them safe to pass to the atmosphere such as by filter (not shown).

The mineral materials are preheated prior to being added to the circulating combustion chamber 1. In detail, a first mineral material which is typically a raw stone material is supplied from supply 19 to second conduit 14 and undergoes initial preheating in second pre-heater cyclone 13. The first mineral material is then passed through first mineral material conduit 18 and introduced into first conduit 11 and subsequently passes to the first pre-heater cyclone 12. The second mineral material is provided from supply 20 to the first conduit 11 downstream of the first mineral material. The second mineral material is generally a processed mineral material typically bonded mineral fibres, such as recycled mineral fibres or waste mineral wool. To ensure that NOx reducing conditions are generated in the first pre-heater cyclone 12, nitrogenous materials such as ammonia can be added at position 21 into the first conduit 11 immediately before the first pre-heater cyclone 12. However, as the waste mineral wool supplied at 20 contains binder with nitrogenous content it may advantageously be obsolete to add ammonia to the conduit 11 as the ammonia contained in the recycled waste mineral wool is sufficient to ensure the NOx reducing conditions in the first pre-heater cyclone 12. Some of the first mineral materials may be carried up with the exhaust gases from the second pre-heater cyclone 13 through conduit 15. These are separated from the exhaust gases in dust cyclone 16 and recycled back to join the preheated mineral materials via conduit 22.

The exhaust gases leave the circulating combustion chamber 1 via the flue 10. The exhaust gases enter the first conduit 11 and are quenched from a temperature of between 1500 and 1900° C., usually around 1650° C. to a temperature of between 1000 and 1500° C. normally around 1300° C. by quenching air. The first mineral material is introduced into the first conduit 11 via inlet downstream of the second mineral material which is introduced into the first conduit 11 via the conduit 18.

The chamber is generally a vertical rather than a horizontal furnace. It normally has a cylindrical top section into which the fuel, mineral material and combustion gas are injected, a frustoconical bottom section and a base section in which the melt can be collected. Alternatively the chamber can be wholly cylindrical. The base section is preferably an integral part of the chamber and can be simply the end part of the frustoconical bottom region or can be a cylindrical section at the end of the bottom region. Preferably, the diameter of the base section is not larger than the diameter of the top section in contrast to traditional systems which often employ a tank at the base of the chamber of enhanced volume.

The base section has an outlet for the mineral melt through which the melt passes as a stream. This stream can then be subjected to fiberisation in any conventional manner, for instance using a cascade spinner or a spinning cup or any other conventional centrifugal fiberising process. Alternatively, the mineral melt can be used in other industrial processes.

It is preferred that, at the point at which the outlet for mineral melt leaves the base section of the chamber, it does not immediately extend down but, instead, the outlet is a siphon. By "a siphon" is meant that the outlet, which is usually a tube or guttering, initially has an upward orientation relative to the opening in the chamber and subsequently has a downward orientation before leading to the fiberising equipment. This is advantageous for the melt quality as any unburnt fuel particles on the surface of the melt are kept inside the chamber.

Fuel is injected into the circulating combustion chamber. Any combustible fuel can be used. The fuel can be gaseous at room temperature, such as butane, propane, methane or natural gas, but is preferably a liquid or solid material. The fuel is preferably in particulate form and is most preferably a particulate carbonaceous material.

The fuel particles preferably have a particle size in the range from 50 to 1000 μm, preferably about 50 to 200 μm. Generally at least 90% of the particles (by weight) are in this range. The average is generally about 70 μm average size, with the range being 90% below 100 μm. The fuel can be fed into the chamber through a feed pipe in a conventional manner to give a stream of fuel particles. This normally involves the use of a carrier gas in which the fuel particles are suspended. The carrier gas can be air, oxygen-enriched air or pure oxygen (preferably at ambient temperature to avoid flashbacks) or a less reactive gas such as nitrogen. The carrier gas is considered to be part of the combustion gas.

At least some and preferably the majority of the fuel is injected into the top section of the circulating combustion chamber. However, in preferred embodiments some fuel, termed secondary fuel, is also injected into the bottom section of the circulating combustion chamber.

Combustion gas is also introduced into the top section of the chamber through a plurality of tangentially arranged inlets and can be at ambient temperature, but is preferably preheated. The temperature of the pre-heated primary combustion gas is often determined by the heat available in the system. Often the combustion gas is pre-heated to around 600° C., and it should at least be pre-heated to between 300 and 600° C., for instance to around 500 to 550° C. The combustion gas can be air or can be oxygen-enriched air. By "oxygen-enriched air" is meant that the gas contains more oxygen than is naturally present in air and can, in addition, contain other gases that are naturally present in air. It can also contain other gases that are not normally present in air, such as propane or methane, providing the total level of oxygen remains over that normally present in air.

In the preferred embodiment the combustion gas is oxygen-enriched air which comprises 25% to 50%, preferably 25% to 35%, oxygen by volume. In an alternative embodiment the combustion gas comprises at least 50% or at least 70% oxygen by volume or even pure oxygen. Throughout the description and claims by "pure oxygen" we mean oxygen of 92% purity or more obtained by, e.g. the vacuum pressure swing absorption technique (VPSA) or it may be almost 100% pure oxygen obtained by a distillation method. Using oxygen-enriched air is advantageous as it reduces the total volume of combustion gas needed. This means that a smaller circulating combustion chamber can be used than when air is used. As both the size of the chamber and the volume of the combustion gas are correlated with the energy needed to produce mineral fibres and the subsequent energy loss, this embodiment results in systems with higher energy efficiency. This has significant benefits in terms of increased economic viability and reduced environmental impact. Where pure oxygen is used it is preferably at ambient temperature, rather than being preheated.

The combustion gas may be introduced through a feed pipe with the fuel suspended in it, especially when the gas is at a relatively low temperature. The fuel should not begin to combust in the fuel pipe before it enters the chamber (a phenomenon known as "flash back") so low gas temperatures are needed in this embodiment. However, the combustion gas is preferably introduced separately through one or more combustion gas inlets which can be located in the vicinity of the fuel feed pipe so that the combustion gas is directed into the chamber in the same region as the fuel, to allow for efficient mixing.

Whether or not they are introduced together, the speed at which the combustion gas is injected into the chamber is relatively low (preferably between 1 and 50 m/s), so as to minimise wear of the apparatus. When the fuel and mineral material are suspended in the combustion gas, the speed is preferably between 5 and 40 m/s. When they are introduced separately, which is preferred, the injection speed of the fuel is preferably 20 to 40 m/s.

It is desirable to ensure that the preheated fuel is mixed rapidly and thoroughly with the combustion gas as this ensures that the fuel is ignited rapidly so that it can undergo pyrolysis, the initial stage of burning, almost immediately after introduction into the chamber. Having thorough mixing also ensures that the residence time of the fuel particles in the primary combustion gas is more uniform thereby leading to more efficient fuel combustion.

To help ensure rapid and thorough mixing an additional gas can be introduced in the top section of the circulating combustion chamber which travels at a higher speed than the combustion gas and the particulate fuel and, due to the speed differential, causes turbulence of the stream of fuel particles thereby breaking up the stream and ensuring rapid mixing. The additional gas is generally much less voluminous than the combustion gas and typically makes up less than 20% of the total gas injected into the combustion chamber, preferably between 5 and 15%. The additional gas can be any gas including air, nitrogen, oxygen, or a flammable gas such as propane or butane. The additional gas may be injected from an inlet so that it is adjacent the stream of fuel particles in the chamber but is preferably injected to an inlet that concentrically surrounds the fuel inlet. This concentric arrangement leads to efficient mixing, particularly where the additional gas inlet has a converging nozzle at its opening. The additional gas is preferably travelling at least 100 m/s faster than the fuel and the combustion gas, usually at least 250 m/s, preferably at least 300 m/s. In the most preferred embodiment, the injection speed of the additional gas is sonic, i.e. at or above the speed of sound.

In addition to the combustion gas that is injected into the top section of the circulating combustion chamber, it is also possible to inject some combustion gas into the bottom section. This can be termed secondary combustion gas. As with the main combustion gas, the secondary combustion gas can be at ambient temperature or preheated and preferably contains at least 25% oxygen. The secondary combustion gas can be oxygen enriched air which comprises at least 30% or 35%, preferably at least 50%, most preferably at least 70% oxygen by volume, or between 30 and 50% oxygen or pure oxygen. The secondary combustion gas can be introduced in any conventional manner but is preferably introduced using an inlet which has a converging nozzle, otherwise known as a lance.

The secondary combustion gas can be injected from one inlet in the lower section but is preferably injected from at least two, most preferably more than two such as three, four, five or six, preferably four inlets.

It is found that adding combustion gas in the bottom section of the circulating combustion chamber is very effective at ensuring full burn-out of the fuel particles. Adding oxygen at this point has been found to be much more effective than simply adding additional oxygen with the primary combustion air in the upper section. The secondary combustion gas can make up less than half of the total combustion gas which includes the main combustion gas, secondary combustion gas and any additional gas that is introduced which is combustible. The secondary combustion gas may make up between 10 to 50%, preferably 20 to 40% of the total percentage of combustion gas. In one embodiment, an additional (or secondary) solid, liquid or gaseous fuel is injected into the bottom section, and burns in the presence of the secondary combustion gas to form a flame in the bottom section. This is particularly important when oxygen-enriched air is used as the combustion gas as although the lower volumes needed advantageous increase energy efficiency. The relative amounts of the oxygen in the secondary combustion gas and the secondary fuel are selected so that there is an excess of oxygen following complete combustion of the secondary fuel in the secondary gas. Injecting secondary fuel into the bottom section is advantageous as it can be used to regulate the temperature of the melt which has collected in the base section.

Forming a flame in the bottom section in addition to the main combustion in the top section is advantageous as it is a mechanism by which the melt temperature can be changed. In particular, in the base section of the circulating combustion chamber the mineral melt flows down the walls to be collected in the base section. Hence, in this region the melt is present as a thin film on the walls of the chamber and as a bath in the base section, which is normally shallow. Applying radiant heat in this area is particularly effective as it can penetrate the whole of the melt easily. Therefore, using a flame in this region is particularly effective at heating the melt homogeneously, rapidly and within accurate parameters so by varying the flow rate of the fuel and gas in this region, the temperature of the melt can be maintained within precise limits.

As this is the purpose, the secondary fuel is preferably injected towards the lower end of the bottom section, preferably in the lower half of the frustoconical bottom section of the chamber, so that it is close to the base section. The secondary fuel can be any fuel. In one embodiment the secondary fuel comprises solely solid fuel like particulate carbonaceous materials such as coal as these are generally very cost effective and can reduce the production of NOx. In another embodiment the secondary fuel includes some liquid or gaseous fuel that combusts immediately and completely. Preferably the secondary fuel includes some solid fuel, such as coal, in amounts such as 10 to 90%, preferably 40 to 80%, most preferably 50 to 70% of the total secondary fuel, where the remainder of the secondary fuel is liquid or gaseous fuel. Preferred non-solid fuels are propane, methane or natural gas. The secondary fuel is present in a lower amount than the particulate fuel and makes up less than 50%, typically 20 to 40% of the total fuel energy.

In this embodiment the secondary combustion gas is preferably pure oxygen and is introduced through a burner inlet with the fuel so that combustion occurs immediately. Alternatively, the secondary combustion gas can be introduced through an inlet close to the inlet for the secondary fuel and mixing can take place in the chamber.

The general motion of gases and suspended particulate material in the circulating combustion chamber is a cyclone motion. This is created by introduction of the combustion gas, as well as particulate fuel and mineral material, at an appropriate angle to sustain the swirling motion. When used, the secondary combustion gas is also preferably introduced in the same direction so as to sustain the circulating currents. The exhaust gases become separated from the mineral melt which is collected in the base of the chamber, and are passed to a heat exchange system, usually via a flue in the top of the circulating combustion chamber. The exhaust gases are then used to preheat the mineral material and optionally also the combustion gas. The exhaust gases typically leave the circulating combustion chamber at a temperature of between 1300 and 1900° C., usually 1500 to 1750° C., such as around 1550 to 1650° C.

In a preferred embodiment the first and second mineral materials are provided separately to the heat exchange system. This is advantageous when the first mineral material has a higher sintering temperature than the second mineral material. The first mineral material is typically a raw mineral material with a sintering temperature of 1200 to 1400° C. whereas the second mineral material is typically a processed waste mineral material, such as bonded mineral fibres, which have a sintering temperature of 900 to 1100° C. To achieve maximum energy efficiency it is very important that the heat energy of the exhaust gases is utilised as fully as possible. It is also important for heat efficiency and to maintain good flow characteristics of the mineral material and hence good process efficiency that the mineral materials are not melted or softened during the preheating. This is dealt with by preheating the first mineral material prior to the second mineral material. In particular, the first mineral material is added to the heat exchange system prior to the second mineral material. By this is meant that the first mineral material is added upstream in the exhaust gases of the second mineral material. After contact with the first mineral material, the first mineral material is preheated and the exhaust gases are cooled and go on with the preheated first mineral material to preheat the second mineral material. It is usual to quench the exhaust gases before contact with the first mineral material. Typically the exhaust gases are quenched to around 1300° C. to avoid softening or melting the first mineral material. The quenching is carried out with any suitable gas such as air or any suitable liquid such as ammonia.

When the exhaust gases contact the first mineral material they preheat it and are themselves cooled. In a first preheating stage the first mineral material is preferably preheated to a temperature of from 300 to 600° C., more preferably 400 to 550° C. Preferably the relative amounts of exhaust gases and first mineral material are such that the first mineral material is preheated by the end of the second preheating stage to slightly below the sintering temperature of the second mineral material, usually 750 to 850° C.

The second mineral material is subsequently added to the heat exchange system and contacts the exhaust gases and first mineral material which is suspended in the exhaust gases. The second mineral material is preheated through this contact. Preferably the second mineral material is preheated to at least 700° C. and preferably to between 750 and 850° C.

The second mineral material is a processed product which includes organic agents such as organic binders. It is particularly advantageous to preheat the second mineral material to a temperature at which and conditions under which the organic additives are completely combusted. Therefore, the gas comprising released organic components should be heated to around 750 to 850° C. for at least 1 to 2 seconds under atmospheric conditions which contain at least 2% oxygen to burn off the organic binder.

The heat exchange system preferably comprises at least one and preferably two or even three pre-heater cyclones 12, 13. The first and second mineral materials are typically added to a first conduit 11 which transports exhaust gases from the circulating combustion chamber 1 to the first pre-heater cyclone 12. In the first pre-heater cyclone 12, the exhaust gases are separated from the mineral material. The mineral material, which comprises the first and second mineral materials mixed, is passed through mixed mineral material conduits 3 to the inlets of the circulating combustion chamber 1 to be melted.

Preferably the exhaust gases which are separated from the melt and which are then fed to the pre-heater cyclone contain less oxygen than the amount which is present in the pre-heater cyclone and so preferably air or other source of oxygen is added to the exhaust gases either in the pre-heater or between the melt and the pre-heater. The exhaust gases are passed from the top of the first pre-heater cyclone 12 through a second conduit 14 to a second pre-heater cyclone 13. It is preferred that the first mineral material undergoes initial preheating in the second pre-heater cyclone 13 before being conveyed to the first conduit 11 to be further preheated by the exhaust gases. Hence, in a preferred embodiment the first mineral material is introduced into the second conduit and is preheated to an initial temperature of between 300 and 600° C., preferably to between 450 and 550° C. The exhaust gases then leave the second pre-heater cyclone 13 and are often used to heat the combustion gas by indirect heat exchange.

The pre-heated material is supplied at 18 into the conduit 11. Downstream the second material supply 20 is provided where waste mineral wool is provided. The waste mineral wool is milled in advance of its reintroduction to the melting process. Fly ash is supplied at 22 to the mineral material exiting the pre-heater cyclone 12 in the conduit 3. Furthermore, a mixture 23 of fly ash and waste mineral wool is supplied directly at the inlet conduit 4 and fed into the cyclone furnace 1 without any advance pre-heating. The waste wool typically has a water content between 5 and 25% by weight such as of approx. 10-15% by weight when, it is supplied. In the first portion for pre-heating this water content evaporates during the processing in the pre-heater cyclone 12. However, the waste mineral wool supplied in the second portion is without preheating and maintains its water content into the furnace 1. Due to the "cold" and "wet" condition of the second portion of waste mineral wool, advantageously mixed with recycled fly ash, the amount of carry-over is minimised.

In total, it is recognised that as much as 3.5 tonnes per hour may be recycled material in a furnace with a capacity of 10 tonnes per hour, i.e. a recycling rate of up to 35%. It is found appropriate that approx. 20% of the waste mineral wool is supplied for pre-heating at 20, e.g. 500 kg/h. Also it is found appropriate to supply about 50% of the total amount of recycled fly ash at 22, e.g. 500 kg/h. This in turn means that the mixture of waste materials supplied at 23 contains about 50% of the total amount of fly ash and 80% of the total amount of waste mineral wool, e.g. the mixture contains approx. 500 kg/h fly ash and 2000 kg/h of waste mineral wool.

The waste mineral wool of the mixture retains the small particles of the fly ash and form lumps when supplied into the hot furnace. This ensures that the fine particles are being caught by the melt layer in the upper part of the cyclone furnace 1 instead of being expelled directly into the exhaust 10 of the cyclone furnace as carry-over.

Above, the invention is described with reference to a preferred embodiment. It is realised that other variants and embodiments may be provided without departing from the scope of the invention as defined in the accompanying claims.

The invention claimed is:

1. A method of making a mineral melt by burning combustible material in the presence of a particulate mineral material and thereby forming a melt, the method comprising the steps of:

supplying a particulate mineral material and a first portion of a waste material into a conduit of a heat exchange system, wherein the first portion of the waste material is a first waste mineral wool;

preheating the supplied particulate mineral material and the first waste mineral wool in the heat exchange system;

injecting a fuel, a combustion gas, the preheated particulate mineral material and the preheated first waste mineral wool into a circulating combustion chamber through an inlet conduit, and combusting the fuel in the circulating combustion chamber thereby melting the particulate mineral material and the first waste mineral wool to form a mineral melt and generating exhaust gases;

separating the exhaust gases from the mineral melt, collecting the mineral melt and passing the exhaust gases upwards through an exhaust pipe to the conduit of the heat exchange system; and supplying a second portion of the waste material with a water content between 5 and 25% by weight directly to the inlet conduit, wherein the second portion of the waste material is a second waste mineral wool.

2. The method according to claim 1, wherein the heat exchange system comprises a pre-heater cyclone which is being fed via said conduit of the heat exchange system with the supply of the particulate mineral material and the supply of the first waste mineral wool for pre-heating before exiting the preheater cyclone through a supply conduit into the inlet conduit for injection into the circulating combustion chamber, wherein according to the method, a third portion of the waste material is supplied to the supply conduit.

3. The method according to claim 2, wherein the waste material supplied in the third portion is fly ash.

4. The method according to claim 2, wherein the second waste mineral wool is supplied directly to the inlet conduit downstream of the supply conduit.

5. The method according to claim 1, wherein the second waste mineral wool is mixed with fly ash before it is supplied directly to the inlet conduit.

6. The method according to claim 1, wherein the first and second waste mineral wool is milled and has a water content of 10-15% by weight prior to being supplied.

7. A method of making a mineral melt by burning combustible material in the presence of particulate mineral material and thereby forming a melt, the method comprising the steps of:

injecting a fuel, a particulate mineral material and a combustion gas into a circulating combustion chamber through an inlet conduit, and combusting the fuel in the circulating combustion chamber thereby melting the mineral material to form a mineral melt and generating exhaust gases;

separating the exhaust gases from the mineral melt, collecting the mineral melt and passing the exhaust gases upwards through an exhaust pipe to a conduit of a heat exchange system; and supplying a particulate mineral material and a first portion of a waste mineral wool into the conduit and pre-heating the supplied particulate mineral material and first portion of waste mineral wool in the heat exchange system, and supplying a second portion of waste mineral wool with a water content between 5 and 25% by weight directly to the inlet conduit, wherein approx. 20% of the total waste mineral wool is supplied into the conduit for pre-heating and approx. 80% of the total waste mineral wool is supplied directly into the inlet conduit.

8. The A method of making a mineral melt by burning combustible material in the presence of particulate mineral material and thereby forming a melt, the method comprising the steps of:
- injecting a fuel, a particulate mineral material and a combustion gas into a circulating combustion chamber through an inlet conduit, and combusting the fuel in the circulating combustion chamber thereby melting the mineral material to form a mineral melt and generating exhaust gases;
- separating the exhaust gases from the mineral melt, collecting the mineral melt and passing the exhaust gases upwards through an exhaust pipe to a conduit of a heat exchange system; and
- supplying a particulate mineral material and a first portion of a waste mineral wool into the conduit and pre-heating the supplied particulate mineral material and first portion of waste mineral wool in the heat exchange system, and
- supplying a second portion of waste mineral wool with a water content between 5 and 25% by weight directly to the inlet conduit,
- wherein the heat exchange system comprises a pre-heater cyclone which is being fed via said conduit with the supply of mineral material and the supply of waste mineral wool material for pre-heating before exiting the preheater cyclone through a supply conduit into the inlet conduit for injection into the circulating combustion chamber, wherein according to the method, a third portion of waste material is supplied to the supply conduit,
- wherein the waste material supplied in the third portion is fly ash,
- wherein approx. 50% of the total fly ash is supplied in the supply conduit and approx. 50% of the total fly ash is mixed with the waste mineral wool prior to being supplied directly into the inlet conduit.

* * * * *